(12) United States Patent
Hoagland et al.

(10) Patent No.: US 8,719,609 B2
(45) Date of Patent: May 6, 2014

(54) USING LATCHED EVENTS TO MANAGE SLEEP/WAKE SEQUENCES ON COMPUTER SYSTEMS

(75) Inventors: Ryan A. Hoagland, Santa Clara, CA (US); Zeh-Chen Liu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 13/271,409

(22) Filed: Oct. 12, 2011

(65) Prior Publication Data

US 2013/0097444 A1    Apr. 18, 2013

(51) Int. Cl.
*G06F 1/32*   (2006.01)
(52) U.S. Cl.
USPC .......................................... 713/323; 713/330
(58) Field of Classification Search
USPC ........................... 710/300, 320, 323, 324, 330
See application file for complete search history.

(56) References Cited

U.S. PATENT DOCUMENTS

| | | | |
|---|---|---|---|
| 4,404,972 A * | 9/1983 | Gordon et al. ................. | 607/16 |
| 6,215,275 B1 | 4/2001 | Bean | |
| 6,404,164 B1 | 6/2002 | Bean et al. | |
| 6,725,384 B1 * | 4/2004 | Lambino et al. .............. | 713/320 |
| 2004/0095096 A1 | 5/2004 | Melton et al. | |
| 2004/0225907 A1 * | 11/2004 | Jain et al. ...................... | 713/320 |
| 2005/0134225 A1 | 6/2005 | Mese et al. | |
| 2008/0016379 A1 * | 1/2008 | Nijhawam et al. ............ | 713/320 |
| 2008/0082845 A1 * | 4/2008 | Morisawa ...................... | 713/323 |
| 2008/0082846 A1 * | 4/2008 | Yoshioka et al. ............. | 713/323 |
| 2008/0098246 A1 * | 4/2008 | Kim .............................. | 713/323 |
| 2009/0132839 A1 * | 5/2009 | Rothman et al. ............. | 713/320 |
| 2009/0164771 A1 * | 6/2009 | Reece et al. ..................... | 713/2 |
| 2009/0204834 A1 * | 8/2009 | Hendin et al. ................ | 713/323 |
| 2009/0259863 A1 * | 10/2009 | Williams et al. ............. | 713/323 |
| 2010/0106886 A1 * | 4/2010 | Marcu et al. .................. | 711/102 |
| 2012/0144177 A1 * | 6/2012 | Iyigun et al. ..................... | 713/2 |

FOREIGN PATENT DOCUMENTS

| | | |
|---|---|---|
| EP | 2224575 A1 | 2/2009 |
| JP | 9044278 A | 2/1997 |
| JP | 2000261975 A1 | 9/2000 |

* cited by examiner

*Primary Examiner* — Glenn A Auve
(74) *Attorney, Agent, or Firm* — Park, Vaughan, Fleming & Dowler LLP; Chia-Hsin Suen

(57) ABSTRACT

The disclosed embodiments provide a system that performs power management on a computer system. The system includes an embedded controller and an operating system. During the execution of a sleep sequence by the operating system, the embedded controller latches events associated with use of the computer system. After the sleep sequence has completed, the embedded controller compares the latched events with a set of enabled wake events for the computer system and a current state of the computer system. If the latched events indicate that the current state corresponds to one of the enabled wake events, the embedded controller triggers a wake sequence on the computer system.

24 Claims, 5 Drawing Sheets

USING LATCHED EVENTS TO MANAGE SLEEP/WAKE SEQUENCES ON COMPUTER SYSTEMS

BACKGROUND

1. Field

The present embodiments relate to power management techniques for computer systems. More specifically, the present embodiments relate to techniques for using latched events to manage sleep/wake sequences on the computer systems.

2. Related Art

Power management may be performed in a computer system by placing the computer system in different power states based on the current and/or future use of the computer system. For example, the Advanced Configuration and Power Interface (ACPI) specification defines a working (e.g., G0) state representing a computer system in a fully powered state, as well four states (e.g., S1, S2, S3, S4) representing different sleeping states into which the computer system may be placed. The sleeping states may correspond to low-power modes that significantly reduce power consumption over that of the G0 state while allowing the computer system to resume execution at a faster rate than booting of the computer system from a fully powered off (e.g., G3) state.

However, the computer system may behave inconsistently during the execution of sleep/wake sequences that transition the computer system between different power states. For example, an operating system of a laptop computer may initiate a sleep sequence that places the laptop computer into a sleep mode after detecting the closing of the laptop computer's lid. During the sleep sequence, the operating system may shut down various services and write a hibernation image to disk. After the operating system shuts down communications with other parts of the computer system, the operating system may no longer be capable of handling events on the computer system. As a result, reopening of the laptop computer's lid during the sleep sequence may or may not result in the subsequent waking of the laptop computer from the sleep mode.

Hence, what is needed is a power-management technique that improves a computer system's consistency of behavior and/or responsiveness to events during sleep/wake sequences.

SUMMARY

The disclosed embodiments provide a system that performs power management on a computer system. The system includes an embedded controller and an operating system. During the execution of a sleep sequence by the operating system, the embedded controller latches events associated with use of the computer system. After the sleep sequence has completed, the embedded controller compares the latched events with a set of enabled wake events for the computer system and a current state of the computer system. If the latched events indicate that the current state corresponds to one of the enabled wake events, the embedded controller triggers a wake sequence on the computer system.

In some embodiments, the embedded controller also provides the latched events to the operating system during the sleep sequence, and the operating system uses the latched events to manage the writing of a hibernation image to a disk on the computer system. For example, the operating system may abandon the writing of the hibernation image to the disk if the latched events comprise one of the enabled wake events.

In some embodiments, the embedded controller also provides the latched events and a wake reason to the operating system during the wake sequence, and the operating system uses the latched events and the wake reason to manage the subsequent execution of the computer system. For example, the operating system may use the latched events and the wake reason to select between a user wake, during which the computer system remains on and the computer system's display is powered, and a dark wake, during which the computer system goes back to sleep after performing a set of tasks and the display is not powered.

In some embodiments, the enabled wake events are set by the operating system during execution of the sleep sequence.

In some embodiments, the sleep sequence, the wake sequence, the latched events, the enabled wake events, and the current state are tracked using a set of registers.

In some embodiments, the latched events include at least one of a lid open, a lid close, a connection of mains power, a disconnection of mains power, an optical disk insertion, an optical disk ejection, a low battery, a hot-plugged device connection, a hot-plugged device disconnection, a power button press, and a key press.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular Application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
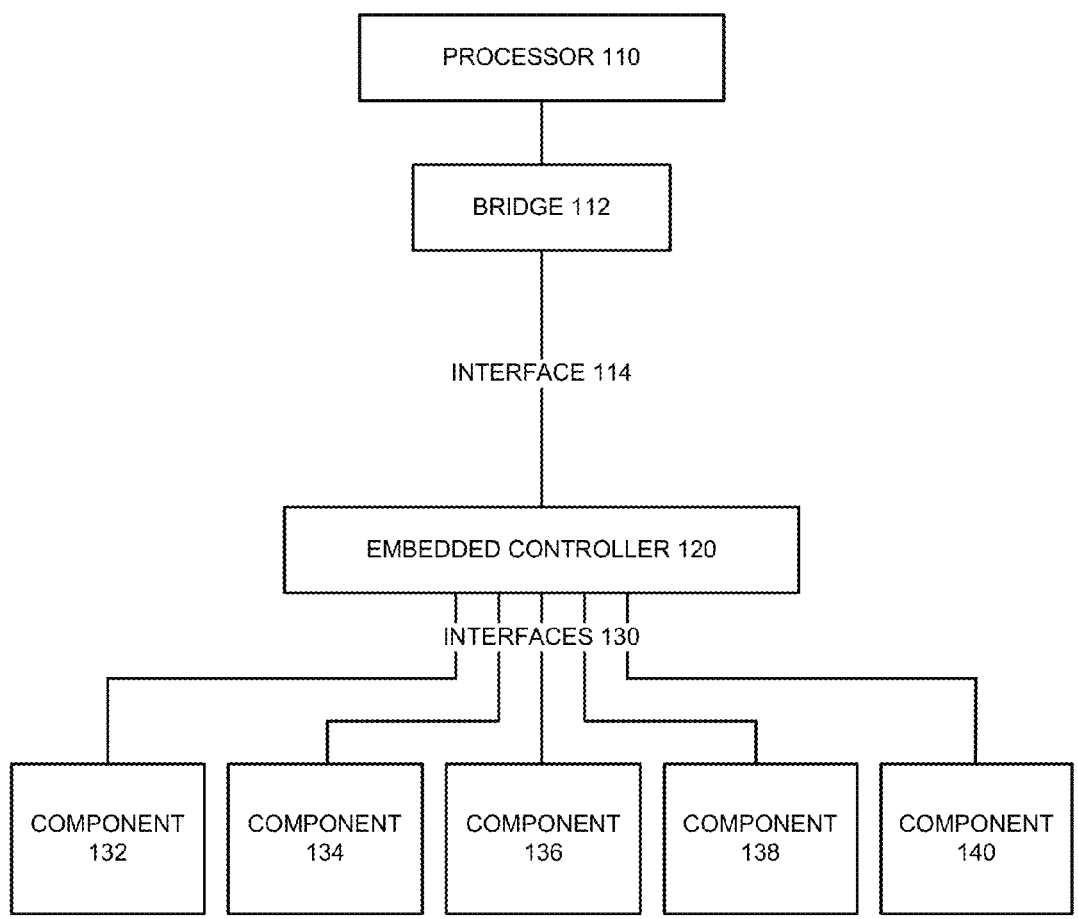
FIG. 1 shows a schematic of a system in accordance with the disclosed embodiments.

The disclosed embodiments provide a method and system for performing power management on a computer system such as a personal computer, laptop computer, workstation, server computer, and/or portable electronic device. As shown in FIG. 1, the system includes a processor 110 and an embedded controller 120. Processor 110 may correspond to a central processing unit (CPU) on which an operating system of the computer system may execute. Processor 110 may be coupled to a bridge chip 112, which in turn is coupled to an embedded controller 120 over an interface 114 such as a Low Pin Count (LPC) interface.

In one or more embodiments, embedded controller 120 includes functionality to monitor events related to use of the computer system. Embedded controller 120 may receive the events from a set of components 132-140 in the computer system over a set of interfaces 130 such as General Purpose Input/Output (GPIO) interfaces. For example, embedded controller 120 may detect the opening or closing of a lid (e.g., laptop lid) in the computer system, the connecting or disconnecting of mains power from the computer system, and/or the insertion or ejection of an optical disk. Embedded controller 120 may also detect a low battery, a connection or disconnection of a hot-plugged device, and/or the pressing of a power button or a key.

The monitored events may then be used by embedded controller 120 and/or the operating system to manage a sleep/wake sequence on the computer system. More specifically, the operating system may include functionality to execute a sleep sequence that transitions the computer system from a working mode to a sleep mode, as well as a wake sequence that transitions the computer system from the sleep mode to the working mode. For example, the operating system may be configured to place the computer system in a number of Advanced Configuration and Power Interface (ACPI) power states, including G0/S0 (e.g., working), S1 through S4 (e.g., sleeping), G2 (e.g., soft off), and G3 (e.g., mechanical off).

In addition, transitions between the power states may be triggered by events received by embedded controller 120 and/or the operating system. For example, the sleep and/or wake sequences may be triggered by user actions (e.g., opening or closing of a laptop lid, pressing of a power button) and/or operating-system-based events (e.g., timer reaching 0). During normal execution of the computer system (e.g., in the working mode), the events may be handled by the operating system. While the computer system is in the sleep mode, the operating system may be shut down, and embedded controller 120 may monitor components 132-140 for events that wake the computer system from the sleep mode (e.g., enabled wake events). If embedded controller 120 receives an enabled wake event, embedded controller 120 may trigger a wake sequence on the computer system.

Those skilled in the art will appreciate that sleep and/or wake sequences in computer systems may be associated with a number of limitations and/or inconsistencies. First, inconsistent behavior may occur if events are received during the execution of sleep sequences. For example, embedded controller 120 may report events to the operating system during execution of a sleep sequence. However, the operating system may not be able to respond to the events after the operating system shuts down communications with embedded controller 120. As a result, an attempt to wake the computer system (e.g., opening of a laptop lid) during the sleep sequence may or may not cause the computer system to actually wake after the sleep sequence completes.

Second, the execution of a wake sequence may detract from the user experience with the computer system if the wake sequence is not related to a user action. For example, a wake sequence may be initiated by embedded controller 120 to allow the operating system to perform a routine task (e.g., obtain a new IP address for a subsequent network-based remote wake) before going back to sleep. During the wake sequence, the operating system may power up the display and/or input/output (I/O) devices of the computer system, thus alerting the user of the computer system to the waking of the computer system. In turn, the user may be bothered and/or confused by the wakened computer system because the wake sequence was triggered independently of user interaction with the computer system.

In one or more embodiments, the system of FIG. 1 includes functionality to improve operating system responsiveness and/or consistency of behavior during sleep/wake sequences on the computer system. During execution of a sleep sequence, the operating system may set a number of enabled wake events for the computer system. As mentioned above, the enabled wake events may correspond to events that may trigger the awakening of the computer system from a sleep mode. For example, the operating system may set the enabled wake events to include a lid open, an insertion of an optical disk, a connection of a hot-plugged device, and/or a press of a key and/or button.

While the operating system executes the sleep sequence, embedded controller 120 may latch events associated with use of the computer system. For example, embedded controller 120 may begin latching events in a latch register after the operating system writes a value corresponding to the sleep mode to a system state register. Registers associated with sleep/wake sequences in the computer system are discussed in further detail below with respect to FIG. 2.

Embedded controller 120 may also provide the latched events to the operating system to allow the operating system to manage the writing of a hibernation image for the computer system to disk (e.g., a hard disk drive (HDD) on the computer system). For example, the operating system may abandon writing of the hibernation image to disk if the latched events include an enabled wake event to facilitate a faster response to the enabled wake event.

After the sleep sequence has completed, embedded controller 120 may compare the latched events with the enabled wake events for the computer system and a current state of the computer system. If the latched events indicate that the current state of the computer system corresponds to one of the enabled wake events, embedded controller 120 may trigger a wake sequence on the computer system, by, for example, sending a signal to bridge chip 112 over interface 114.

As with execution of the sleep sequence, embedded controller 120 may continue latching events during the wake sequence until the operating system has signaled the resumption of regular communications in the computer system (e.g., by writing a value corresponding to the working mode to the system state register). Embedded controller 120 may also provide the latched events and a wake reason to the operating system during the wake sequence to allow the operating system to manage the subsequent execution of the computer system. For example, the operating system may use the latched events and wake reason to select between a user wake, during which the computer system remains on and the computer system's display is powered, and a dark wake, during which the computer system goes back to sleep after performing a set of tasks and the display is not powered. Management of sleep/wake sequences based on latched events is discussed in further detail below with respect to FIG. 3.

Figure 2:
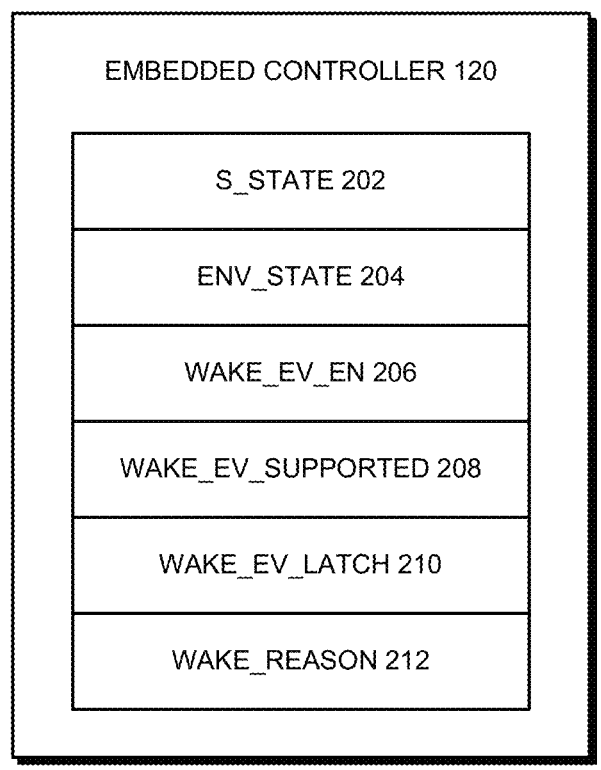
FIG. 2 shows a set of registers associated with an embedded controller in accordance with the disclosed embodiments.

FIG. 2 shows a set of registers associated with embedded controller 120 in accordance with the disclosed embodiments. As mentioned above, the registers may be used by embedded controller 120 and/or an operating system to perform power management on a computer system. The registers may be maintained by embedded controller 120 to enable updates to the registers after the operating system is shut down (e.g., in sleep mode). For example, the registers may be stored in memory on embedded controller 120 and accessed by the operating system using an ACPI table. As shown in FIG. 2, the registers may include an S_STATE register 202, an ENV_STATE register 204, a WAKE_EV_EN register 206, a WAKE_EV_SUPPORTED register 208, a WAKE_EV_LATCH register 210, and a WAKE_REASON register 212.

S_STATE 202 may be used by the operating system to signal transitions between power states to embedded controller 120. For example, the operating system may write a value of 3 to S_STATE 202 to communicate a transition from a working state to an S3 (e.g., sleeping) state to embedded controller 120. On the other hand, the operating system may write a value of 0 to S_STATE 202 to notify embedded controller 120 of the operating system's capability to handle notifications (e.g., ACPI notifications) during a transition from a sleeping state to a G0/S0 (e.g., working) state.

ENV_STATE 204 may store the current state of the computer system. Each bit in ENV_STATE 204 may track the occurrence of a different event in the computer system at the current time. For example, bits of ENV_STATE 204 may be set or cleared based on the current state of the computer's system lid (e.g., opened or closed), connection to mains power (e.g., connected or disconnected), optical disk drive (e.g., optical disk present or absent), battery (e.g., low or not low), and/or hot-plugged devices (e.g., connected or disconnected).

WAKE_EV_EN 206 may be used by the operating system to set enabled wake events for the computer system. As with ENV_STATE 204, each bit in WAKE_EV_EN 206 may represent a different event in the computer system. For example, the operating system may set a bit in WAKE_EV_EN 206 to set the corresponding event as an enabled wake event. In addition, the operating system may set WAKE_EV_EN 206 prior to placing the computer system in a sleep mode so that the events by which the computer system may be awakened may be based on the computer system's state and/or activity level prior to entering the sleep mode. For example, the operating system may enable more wake events if the computer system had multiple executing applications and/or network connections prior to entering the sleep mode. Conversely, the operating system may enable only basic wake events (e.g., power button press, lid open, etc.) if the computer system had little to no executing applications and/or network activity.

WAKE_EV_SUPPORTED 208 may be used by embedded controller 120 to communicate supported wake events to the operating system. Bits of WAKE_EV_SUPPORTED 208 may represent the same events as the bits of WAKE_EV_EN 206 and/or ENV_STATE 204. A bit may be set if the corresponding event can be detected by embedded controller 120 and cleared otherwise. For example, bits in WAKE_EV_SUPPORTED 208 that represent the opening and closing of laptop lids may be set for a laptop computer and cleared for a desktop computer. Similarly, bits in WAKE_EV_SUPPORTED 208 that represent the insertion and ejection of an optical disk may be set for a computer system with an optical disk drive and cleared for a computer system that lacks an optical disk drive.

WAKE_EV_LATCH 210 may be used to latch events during periods in which the value of S_STATE 202 corresponds to a sleep mode. During the sleep mode, embedded controller 120 may set a bit in WAKE_EV_LATCH 210 if the corresponding event has occurred. For example, embedded controller 120 may track the opening and subsequent closing of a laptop lid during the sleep mode by setting both a bit representing a lid open and a bit representing a lid close in WAKE_EV_LATCH 210. Embedded controller 120 may then compare WAKE_EV_LATCH 210 with WAKE_EV_EN 206 and ENV_STATE 204 to determine if the computer system's current state corresponds to one of the wake events. For example, WAKE_EV_EN 206 may indicate a "lid open" event as an enabled wake event. If the bits for both "lid open" and "lid close" are set in WAKE_EV_LATCH 210 but only the bit for "lid close" is set in ENV_STATE 204, embedded controller 120 may keep the computer system in the sleep mode because the current state of the computer system's lid (e.g., closed) does not correspond to an enabled wake event. Conversely, if the bit for "lid open" is set in ENV_STATE 204, embedded controller 120 may trigger a wake sequence on the computer system.

Finally, WAKE_REASON 212 may specify the latched event that triggered a wake sequence. Embedded controller 120 may thus use WAKE_REASON 212 to differentiate the event from other events that may have occurred after the wake sequence is initiated. For example, if embedded controller 120 receives a "lid open" event followed by a "power button press" event, embedded controller 120 may latch both events in WAKE_EV_LATCH 210, initiate the wake sequence, and set the bit corresponding to "lid open" in WAKE_REASON 212. After the operating system resumes communications with embedded controller 120 (e.g., by setting S_STATE 202 to 0), the operating system may use both WAKE_REASON 212 and WAKE_EV_LATCH 210 to identify the occurrence of both events prior to the resumption of communications, as well as the order in which the events occurred.

Figure 3:
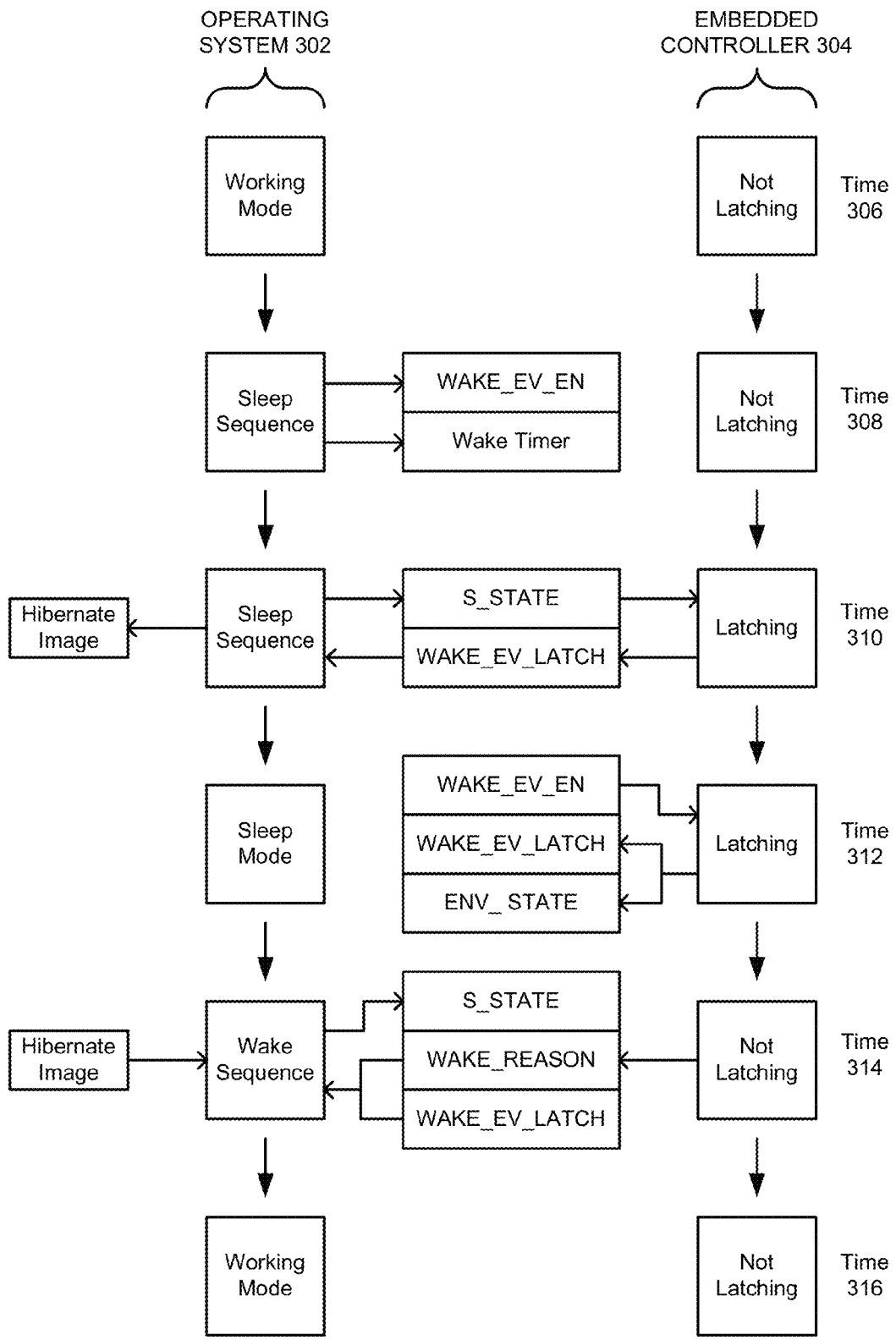
FIG. 3 shows a timeline of operations involved in performing power management in a computer system in accordance with the disclosed embodiments.

FIG. 3 shows a timeline of operations involved in performing power management in a computer system in accordance with the disclosed embodiments. More specifically, FIG. 3 shows a sequence of operations associated with an operating system 302 executing on a processor of the computer system and an embedded controller 304. The operations may allow operating system 302 and embedded controller 304 to increase the computer system's responsiveness and/or consistency of behavior during sleep/wake sequences.

Beginning with time 306, operating system 302 may be in a working mode (e.g., G0 or S0), and embedded controller 304 may not be latching events. Next, at time 308, operating system 302 may initiate a sleep sequence that transitions the computer system from the working mode to a sleep mode. The sleep sequence may be triggered by a user-generated event such as the pressing of a power button, the selection of a menu item, and/or the closing of a lid. Alternatively, the sleep sequence may be caused by a system-related event. For example, operating system 302 may initiate the sleep sequence after the computer system is idle for a pre-specified period and/or the battery level falls below a threshold to reduce the power consumption of the computer system. Upon initiating the sleep sequence, operating system 302 may set a WAKE_EV_EN register (e.g., WAKE_EV_EN 206 of FIG. 2) to specify a set of enabled wake events for the computer system. Operating system 302 may also set a wake timer for subsequently waking the computer system after the computer system has been placed into the sleep mode for a pre-specified period.

At time 310, operating system 302 may write a new value to an S_STATE register (e.g., S_STATE 202 of FIG. 2) to notify embedded controller 304 of the sleep sequence. For example, operating system 302 may write a value of 3 or 4 to S_STATE to communicate a transition to the S3 or S4 sleep state to embedded controller 304. Upon receiving the new value for S_STATE, embedded controller 304 may begin latching events associated with use of the computer system by writing to a WAKE_EV_LATCH (e.g., WAKE_EV_LATCH 210 of FIG. 2) register.

Embedded controller 304 may also provide the contents of WAKE_EV_LATCH to operating system 302 to facilitate execution of the sleep sequence by operating system 302. In particular, operating system 302 may use the latched events to manage the writing of a hibernation image to a disk (e.g., HDD) on the computer system. If the latched events include an enabled wake event, operating system 302 may abandon the writing of the hibernation image to disk to facilitate a response to the enabled wake event by embedded controller 304.

For example, an enabled wake event may be latched by embedded controller 304 during writing of the hibernation image to disk, signifying user intent to exit the sleep mode and resume use of the computer system (e.g., the working mode). However, operating system 302 may not be able to abort the sleep sequence upon receiving the enabled wake event. Instead, operating system 302 may complete the sleep sequence to reach a consistent state (e.g., sleep mode) in the computer system before the latched event triggers a wake sequence in the computer system. To expedite the completion of the sleep sequence and the subsequent return to the working mode, operating system 302 may abandon writing of the hibernation image to disk.

At time 312, operating system 302 may be in sleep mode, and embedded controller 304 may track latched events in WAKE_EV_LATCH and a current state of the computer system in ENV_STATE (e.g., ENV_STATE 204 of FIG. 2). Embedded controller 304 may also compare the latched events, current state, and enabled wake events by continuously looping through bits of the WAKE_EV_LATCH, ENV_STATE, and WAKE_EV_EN registers. If the latched events indicate that the current state corresponds to one of the enabled wake events, embedded controller 304 may trigger a wake sequence on the computer system.

At time 314, embedded controller 304 has triggered the wake sequence. During the wake sequence, operating system 302 may initialize a number of services and/or read the hibernate image from the disk, if needed. Once operating system 302 is capable of communicating with embedded controller 304, operating system may write a new value to S_STATE (e.g., 0), and embedded controller 304 may stop latching events in WAKE_EV_LATCH.

Embedded controller 304 may then provide the latched events and a WAKE_REASON (e.g., WAKE_REASON 212 of FIG. 2) register to operating system 302, and operating system 302 may use the latched events and WAKE_REASON to manage the subsequent execution of the computer system.

For example, if the latched events and/or WAKE_REASON indicate that the wake sequence was triggered by a user-generated event (e.g., button/key press, lid open, user-scheduled wake, etc.), operating system 302 may perform a user wake by powering up the display of the computer system and enabling full use of the computer system in working mode. On the other hand, if the latched events and/or WAKE_REASON indicate that the wake sequence was triggered by a system event (e.g., timer), operating system 302 may perform a dark wake by keeping the display powered off, performing a routine set of tasks, and executing another sleep sequence after the tasks have been completed. Finally, at time 316, operating system 302 is back in the working mode, and embedded controller 304 continues not latching events.

Consequently, the operations of FIG. 3 may improve the computer system's responsiveness and/or consistency of behavior during sleep/wake sequences. In particular, the latching of events by embedded controller 304 during the sleep and/or wake sequences may ensure that the events are recorded and subsequently processed, even if the operating system is incapable of handling the events as the events occur. In addition, operating system 302 may use the latched events to optimize the sleep and/or wake sequences by, for example, managing the writing of the hibernation image to disk during the sleep sequence and/or selecting between a user wake and a dark wake during the wake sequence. Finally, the configurability of the computer system in handling sleep/wake sequences may be increased by using programmable registers and/or tables to track and/or communicate events and states between embedded controller 304 and operating system 302.

Figure 4:
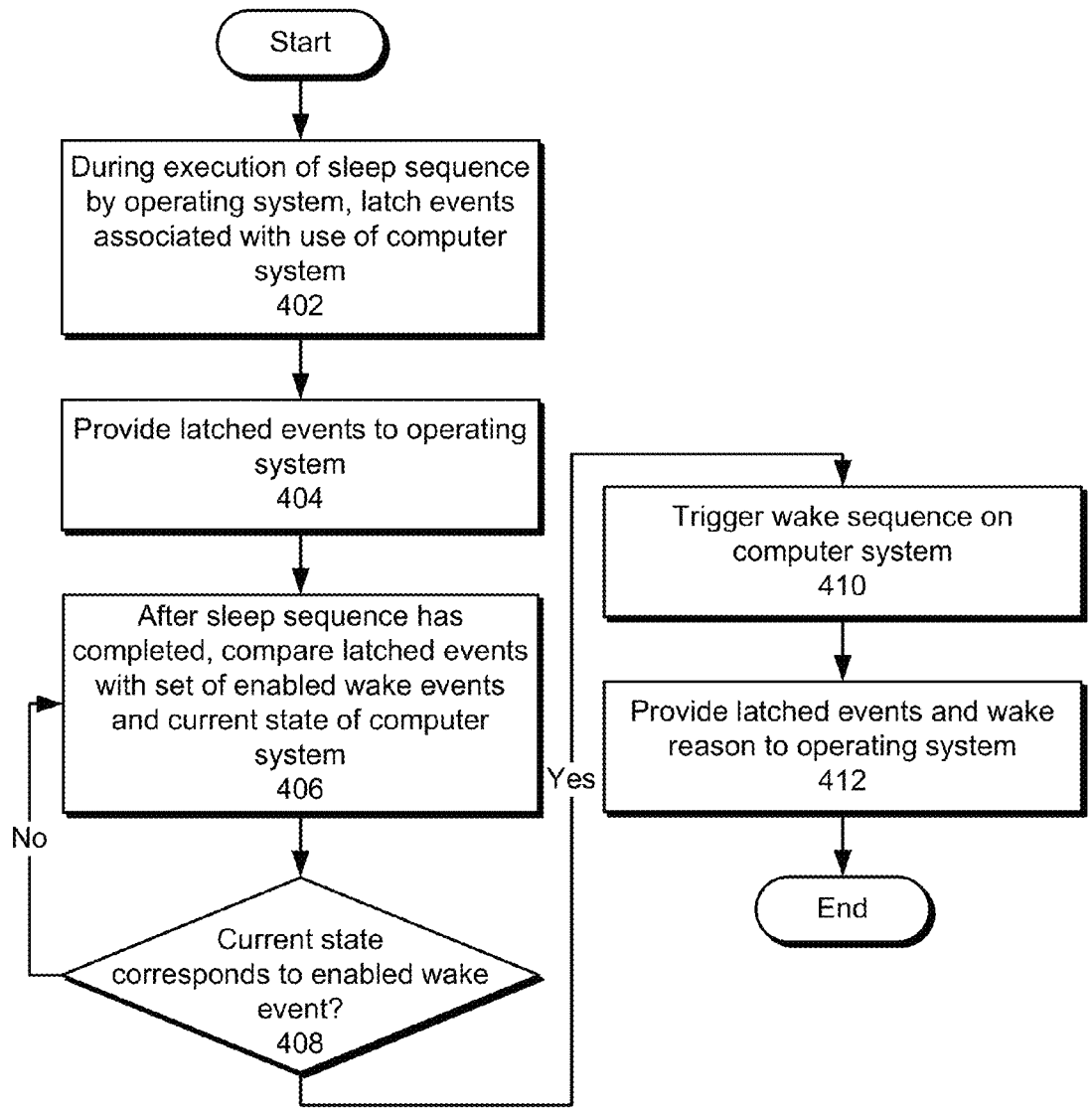
FIG. 4 shows a flowchart illustrating the process of performing power management in a computer system in accordance with the disclosed embodiments.

FIG. 4 shows a flowchart illustrating the process of performing power management in a computer system in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, events associated with use of the computer system are latched during execution of a sleep sequence by an operating system on the computer system (operation 402). The latched events may include a lid open, a lid close, a connection of mains power, a disconnection of mains power, an optical disk insertion, an optical disk ejection, a low battery, a hot-plugged device connection, a hot-plugged device disconnection, a power button press, and/or a key press. During the sleep sequence, the operating system may transition the computer system from a working mode to a sleep mode. The operating system may also provide a set of enabled wake events for subsequent use in triggering a wake sequence that transitions the computer system from the sleep mode to the working mode.

The latched events are provided to the operating system (operation 404) during the sleep sequence to allow the operating system to manage the writing of a hibernation image to a disk on the computer system. For example, the operating system may abandon the writing of the hibernation image to disk if the latched events include one of the enabled wake events.

After the sleep sequence has completed, the latched events may be compared with the enabled wake events and a current state of the computer system (operation 406) to determine if the current state corresponds to an enabled wake event (operation 408). For example, the latched events, enabled wake events, and current state may be compared by looping through bits of registers storing the latched events, enabled wake events, and current state. If the current state does not correspond to an enabled wake event, comparison of the latched events, enabled wake events, and current state may continue, and the computer system may remain in the sleep mode.

If the current state corresponds to an enabled wake event, a wake sequence is triggered on the computer system (operation 410). During the wake sequence, the operating system may transition the computer system from the sleep mode to the working mode. The latched events and a wake reason may also be provided to the operating system (operation 412) and used by the operating system to manage the subsequent execution of the operating system. For example, the latched events and wake reason may be provided to the operating system once the operating system has signaled the resumption of regular communications in the computer system. The operating system may then use the latched events and wake reason to transition the computer system into a dark wake and/or a user wake.

Figure 5:
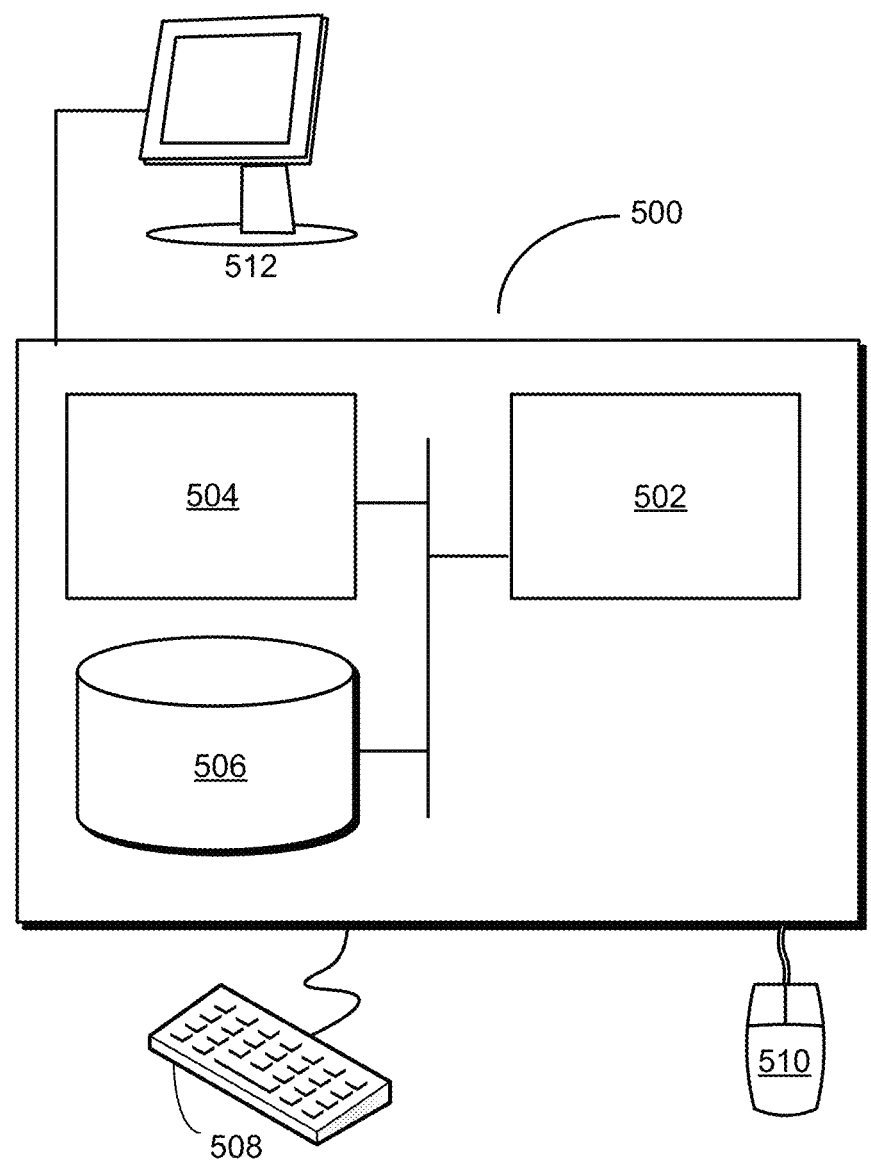
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for performing power management on a computer system (e.g., computer system 500). The system may include an operating system executing on a processor. The operating system may execute a sleep sequence that transitions the computer system from a working mode to a sleep mode and execute a wake sequence that transitions the computer from the sleep mode to the working mode. The system may also include an embedded controller that latches events associated with use of the computer system during execution of the sleep sequence by the operating system. After the sleep sequence has completed, the embedded controller may compare the latched events with a set of enabled wake events for the computer system and a current state of the computer system. If the latched events indicate that a current state of the computer system corresponds to one of the enabled wake events, the embedded controller may trigger the wake sequence.

In addition, one or more components of computer system 500 may be remotely located and connected to the other components over a network. Portions of the present embodiments (e.g., operating system, processor, embedded controller, etc.) may also be located on different nodes of a distributed system that implements the embodiments. For example, the present embodiments may be implemented using a cloud computing system that performs power management on a remote computer system.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for performing power management on a computer system, comprising:
   during the execution of a sleep sequence by an operating system on the computer system, latching events associated with use of the computer system;
   after the sleep sequence has completed, comparing the latched events with a set of enabled wake events for the computer system and a state variable, wherein the state variable comprises a set of bits, wherein each bit tracks occurrences of an associated event, and can be set or cleared based on occurrences of the associated event; and
   if the latched events and the state variable are consistent with one of the enabled wake events, triggering a wake sequence on the computer system.

2. The method of claim 1, further comprising:
   providing the latched events to the operating system during the sleep sequence,
   wherein the latched events are used by the operating system to manage the writing of a hibernation image to a disk on the computer system.

3. The method of claim 2, wherein the writing of the hibernation image to the disk is abandoned if the latched events comprise one of the enabled wake events.

4. The method of claim 1, further comprising:
   providing the latched events and a wake reason to the operating system during the wake sequence,
   wherein the latched events and the wake reason are used by the operating system to manage the subsequent execution of the computer system.

5. The method of claim 4, wherein the subsequent execution of the computer system is associated with at least one of a user wake and a dark wake.

6. The method of claim 1, wherein the enabled wake events are set by the operating system during execution of the sleep sequence.

7. The method of claim 1, wherein the sleep sequence, the wake sequence, the latched events, the enabled wake events, and the state variable are tracked using a set of registers.

8. The method of claim 1, wherein the latched events comprise at least one of:
   a lid open;
   a lid close;
   a connection of mains power;
   a disconnection of mains power;
   an optical disk insertion;
   an optical disk ejection;
   a low battery;
   a hot-plugged device connection;
   a hog-plugged device disconnection;
   a power button press; and
   a key press.

9. A system for performing power management on a computer system, comprising:
   an operating system which executes on a processor and is configured to:
      execute a sleep sequence that transitions the computer system from a working mode to a sleep mode; and
      execute a wake sequence that transitions the computer from the sleep mode to the working mode; and an embedded controller configured to:
- latch events associated with use of the computer system during execution of the sleep sequence by the operating system;
- after the sleep sequence has completed, compare the latched events with a set of enabled wake events for the computer system and a state variable, wherein the state variable comprises a set of bits, wherein each bit tracks occurrences of an associated event, and can be set or cleared based on occurrences of the associated event; and
- if the latched events and the state variable are consistent with one of the enabled wake events, trigger the wake sequence.

10. The system of claim 9, further comprising:
a set of registers configured to track the sleep sequence, the wake sequence, the latched events, the enabled wake events, and the state variable.

11. The system of claim 9,
wherein the embedded controller is further configured to provide the latched events to the operating system during the sleep sequence, and
wherein the operating system is further configured to use the latched events to manage the writing of a hibernation image to a disk on the computer system.

12. The system of claim 11, wherein the operating system abandons the writing of the hibernation image to the disk if the latched events comprise one of the enabled wake events.

13. The system of claim 9,
wherein the embedded controller is further configured to provide the latched events and a wake reason to the operating system during the wake sequence, and
wherein the operating system is further configured to use the latched events and the wake reason to manage the subsequent execution of the computer system.

14. The system of claim 13, wherein the subsequent execution of the computer system is associated with at least one of a user wake and a dark wake.

15. The system of claim 9, wherein the enabled wake events are set by the operating system during execution of the sleep sequence.

16. The system of claim 9, wherein the latched events comprise at least one of:
- a lid open;
- a lid close;
- a connection of mains power;
- a disconnection of mains power;
- an optical disk insertion;
- an optical disk ejection;
- a low battery;
- a hot-plugged device connection;
- a hog-plugged device disconnection;
- a power button press; and
- a key press.

17. A non-transitory computer-readable storage medium storing instructions that when executed by a computer cause the computer to perform a method for performing power management on a computer system, the method comprising:
- during execution of a sleep sequence by an operating system on the computer system, latching events associated with use of the computer system; after the sleep sequence has completed, comparing the latched events with a set of enabled wake events for the computer system and a state variable, wherein the state variable comprises a set of bits, wherein each bit tracks occurrences of an associated event, and can be set or cleared based on occurrences of the associated event; and
- if the latched events and the state variable are consistent with one of the enabled wake events, triggering a wake sequence on the computer system.

18. The non-transitory computer-readable storage medium of claim 17, the method further comprising:
providing the latched events to the operating system during the sleep sequence,
wherein the latched events are used by the operating system to manage the writing of a hibernation image to a disk on the computer system.

19. The non-transitory computer-readable storage medium of claim 18, wherein the writing of the hibernation image to the disk is abandoned if the latched events comprise one of the enabled wake events.

20. The non-transitory computer-readable storage medium of claim 17, the method further comprising:
providing the latched events and a wake reason to the operating system during the wake sequence,
wherein the latched events and the wake reason are used by the operating system to manage the subsequent execution of the computer system.

21. The non-transitory computer-readable storage medium of claim 20, wherein the subsequent execution of the computer system is associated with at least one of a user wake and a dark wake.

22. The non-transitory computer-readable storage medium of claim 17, wherein the enabled wake events are set by the operating system during execution of the sleep sequence.

23. The non-transitory computer-readable storage medium of claim 17, wherein the sleep sequence, the wake sequence, the latched events, the enabled wake events, and the state variable are tracked using a set of registers.

24. The non-transitory computer-readable storage medium of claim 17, wherein the latched events comprise at least one of:
- a lid open;
- a lid close;
- a connection of mains power;
- a disconnection of mains power;
- an optical disk insertion;
- an optical disk ejection;
- a low battery;
- a hot-plugged device connection;
- a hog-plugged device disconnection;
- a power button press; and
- a key press.

* * * * *